United States Patent [19]

Morimoto et al.

[11] Patent Number: 5,031,162
[45] Date of Patent: Jul. 9, 1991

[54] MAGNETO-OPTICAL RECORDED MEDIUM WITH A TRANSPARENT SUBSTRATE LAYER

[75] Inventors: Yasuaki Morimoto; Friedhelm Zucker, both of Villingen-Schwenningen; Christian Büchler; Heinz-Jörg Schröder, both of Marbach, all of Fed. Rep. of Germany

[73] Assignee: Deutsche Thomson-Brandt GmbH, Hanover, Fed. Rep. of Germany

[21] Appl. No.: 250,729

[22] Filed: Sep. 28, 1988

[30] Foreign Application Priority Data

Sep. 30, 1987 [DE] Fed. Rep. of Germany ....... 3732875

[51] Int. Cl.$^5$ .................... G11B 13/04; G11B 7/24
[52] U.S. Cl. .................... 369/13; 369/275.4; 369/275.2; 369/275.1
[58] Field of Search .............. 369/13, 275.2, 275.1, 369/275.3, 275.4; 360/114, 59, 131, 135; 365/122

[56] References Cited

U.S. PATENT DOCUMENTS

| | | | |
|---|---|---|---|
| 4,467,383 | 8/1984 | Ohta et al. | 360/131 |
| 4,730,289 | 3/1988 | Saitoh et al. | 369/13 |
| 4,737,947 | 4/1988 | Osato et al. | 360/131 |

FOREIGN PATENT DOCUMENTS

| | | | |
|---|---|---|---|
| 2578083 | 8/1986 | France | 369/13 |
| 57-186247 | 11/1982 | Japan | 369/13 |
| 58-11343 | 7/1983 | Japan . | |
| 59-77648 | 5/1984 | Japan | 369/13 |
| 61-68742 | 4/1986 | Japan . | |
| 61-190742 | 8/1986 | Japan | 369/13 |
| 62-60147 | 3/1987 | Japan . | |
| 57-74853 | 5/1987 | Japan | 369/13 |

OTHER PUBLICATIONS

"Magnetooptische Versuche dauern an" publication, Funkschau 13/1986, pp. 37–41.

Primary Examiner—Stuart S. Levy
Assistant Examiner—Hoa Nguyen
Attorney, Agent, or Firm—Max Fogiel

[57] ABSTRACT

An optically-recorded medium in which a reflecting optomagnetic layer is applied to a transparent substrate layer. The recorded medium stores data magnetically and by pits. The magnetically stored data and the pit stored data are superimposed on each other, so that every spot and region on the recorded medium stores both magnetically stored data and pit stored data. The recorded medium is not divided into separate regions for magnetically stored data and pit stored data, and the magnetically stored data and pit stored data may be read out simultaneously by a single light beam.

12 Claims, 5 Drawing Sheets

MAGNETO-OPTICAL RECORDED MEDIUM WITH A TRANSPARENT SUBSTRATE LAYER

BACKGROUND OF THE INVENTION

The invention concerns an optical recording medium with a transparent-substrate layer and a method of manufacturing a medium of that type.

The term "optical recording medium" as used herein is to be understood as a medium carrying recorded data or being a blank. If the medium has already recorded data, it can be rerecorded or overwritten. If the medium is blank, on the other hand, data can be recorded thereon.

One known example of an optical recording medium is a compact disc, which has a transparent layer on top of a reflecting aluminum layer. The light-reflecting aluminum layer has depressions called "pits" that represent data stored on the disc. The data can be read from the compact disc by means of an optical pick-up, because the reflectivity of the light-reflecting aluminum layer depends on the pattern of the depressions in the disc. Less light is reflected from a depression, which is often called a "groove," than from an elevation, which is often called "land."

From the intensity of the light reflected by the disc accordingly, the optical pick-up determines whether the bit being scanned is a logical one or a logical zero for example.

Another optical medium of this type, called an "optomagnetic disc," is described in the article "Magnetooptische Versuche dauern an" ["Optomagnetic testing continues"] on pages 37 to 41 of Funkschau 13, 21 (June 1986).

An optomagnetic disc, in contrast to a conventional compact disc, has sometimes no pits. Below the transparent layer is a magnetic layer, in which data can be stored and from which data can be read out. The procedure for writing data onto an optomagnetic disc will now be described.

A laser beam focused on the disc heats the magnetic layer to the vicinity of the Curie point. It is, however, usually sufficient to heat the layer to a compensation temperature that is below the Curie point. An electromagnet is positioned behind the laser beam's focus on the disc and magnetizes the area heated by the laser in one polarity or another. As the temperatures of the heated points drop below the Curie point again when the laser beam is turned off, the magnetic polarity established by the electromagnet remains constant. The individual bits are thereby stored as domains of differing magnetic polarity, with one polarity, for example, representing a logical one and the other a logical zero.

The data can be read out by exploiting the Kerr effect. The plane of polarity of a linearly polarized beam of light is rotated through a measurable angle when reflected by a magnetized domain. Depending on the direction in which the domain is magnetized, the plane of polarization of the reflected beam will be rotated either left or right. Since, however, the recorded domains on the disc act like magnetized mirrors, the plane of polarization of a scanning beam of light will be rotated right or left to a measurable extent depending on the magnetic polarity of the domains being scanned at that instant.

From the rotation of the plane of polarization of the light beam reflected from the disc, the optical pick-up determines whether the bit is a logical one or a logical zero. In contrast to a compact disc, an optomagnetic disc can be erased and rerecorded almost as often as desired.

Although the storage capacity of both types of optical recording media—compact discs and optomagnetic discs—is satisfyingly high, a substantial increase in that capacity would be very desirable and useful, especially in relation to computers and videodisc players.

Japanese Application 62 60 147 discloses an optomagnetic disc with short patterns of pits containing address labels at prescribed intervals along the data-storage tracks. The purpose of the address labels is to allow the data stored on the disc to be arranged in individual sections.

Japanese Application 58 114 343 discloses a circular optomagnetic disc divided into several sectors. The individual sectors store alternately optomagnetic data and data represented by patterns of pits so that every optomagnetic sector is followed by a sector with patterns of pits.

An optomagnetic disc known from Japanese Application 58 211 346 has patterns of pits distributed along the tracks between each pair of optomagnetic layers. One pattern of pits follows each optomagnetic layer as the track is traversed. The patterns of pits represent track addresses.

Finally, Japanese Application 61 68 472 discloses an optomagnetic disc on which the data are stored alternately in spiral and circular optomagnetic data-storage tracks and in data-storage tracks represented by pits. One winding of the spiral or one concentric circle is optomagnetic and the next contains patterns of pits. Thus, one winding or one circle is always situated between two circles or two windings.

None of the aforesaid optomagnetic discs, however, has a storage capacity that is increased by the procedures disclosed in the Japanese applications in relation to that of a conventional optomagnetic or optical disc.

SUMMARY OF THE INVENTION

The object of the invention is, accordingly, to substantially expand the storage capacity of an optical recording medium.

One embodiment of the invention is characterized in that the transparent-substrate layer is followed by a reflecting optomagnetic layer in which data can be stored both magnetically and by means of depressions or pits.

Another embodiment of the invention is characterized in that the transparent-substrate layer is followed by a partly transparent and partly reflecting optomagnetic layer in which data can be stored magnetically. The optomagnetic layer is followed by a first transparent layer, which is followed in turn by a second transparent layer, in which data can be stored by means of depressions or pits.

A third embodiment of the invention is characterized in that the transparent-substrate layer is followed by a partly transparent and partly reflecting layer in which data can be stored magnetically. The optomagnetic layer is followed by a transparent layer in which data can be stored by means of pits located on a side of the transparent layer.

DESCRIPTION OF THE PREFERRED EMBODIMENTS

The optical recording medium is a combination compact disc and optomagnetic disc. Instead of a reflecting aluminum layer, it has a layer that is both reflecting and optomagnetic and also has pits. Since data can be represented by patterns of pits and also magnetically stored in and erased from the reflecting optomagnetic layer, the storage capacity of the disc in accordance with the invention is double.

The invention also makes it possible to read both data represented by patterns of pits, and data stored in the magnetic domains with an appropriate optical pick-up. This measure doubles the data rate. It is also possible to write new data into the magnetic domains while data represented by patterns of pits are simultaneously being read out.

To write data into the reflecting optomagnetic layer, the output of a source of light such as a laser, is increased until the compensation temperature is exceeded at the focal point of the laser. To read data out on the other hand, the output of the laser is decreased until the temperature within the reflecting optomagnetic layer is far enough below the compensation point to prevent data from being erased unintentionally.

Figure 1:
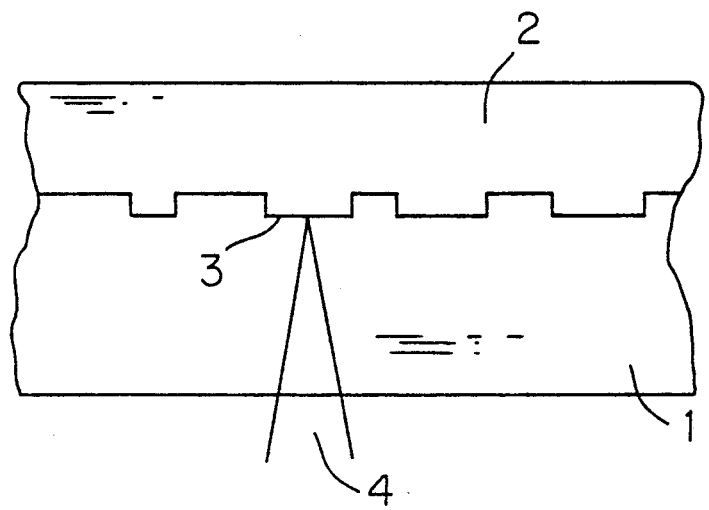
FIG. 1 illustrates the optical recording medium according to the present invention.

FIG. 1 is a cross-section through a disc-shaped recording medium in accordance with the invention. Immediately adjacent to a transparent-substrate layer 1 is a reflecting optomagnetic layer 2 with pits 3. A beam 4 of light that not only reads and writes optomagnetically but also reads the pits that is reflected from optomagnetic layer 2 onto an optical pick-up.

To decrease the depth of modulation of the intensity of the reflected light to advantage, the depths are shallower than those in conventional compact discs. The depth of modulation will be practical when the depths of pits are approximately 1/10 of the wavelength $\lambda$ of the scanning beam of light. This measure results in the advantage that the output of the source, usually a laser, can be lower if the intensity of the light reflected from the compact disc during optical scanning is maintained constant. Since optomagnetic layer 2 is accordingly not heated up as much while being read, the margin of safety in relation to the critical Curie point can be increased. Unintentional erasure or overwriting of data is accordingly excluded when the pits are shallower.

Figure 2:
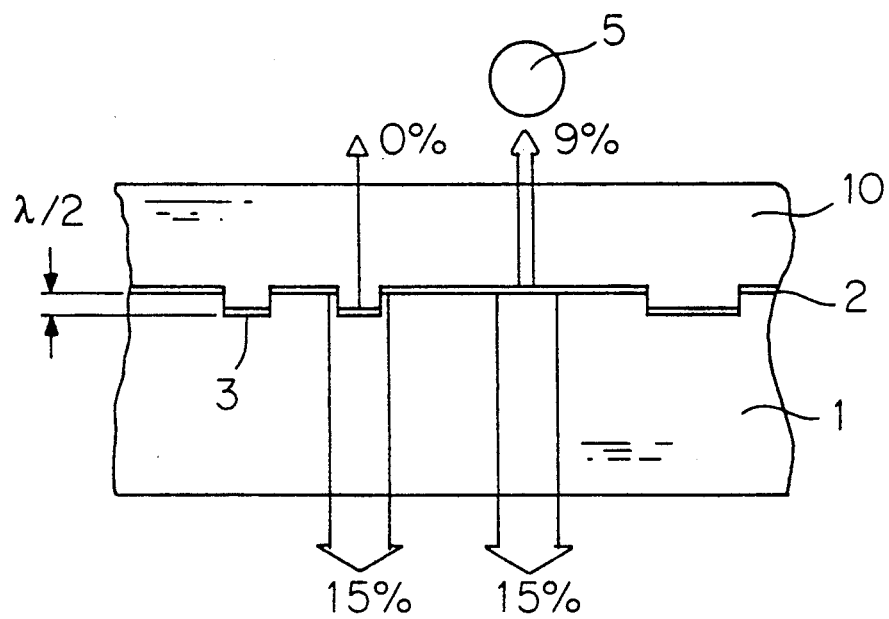
FIG. 2 illustrates the optical recording medium in conjunction with a circular photodetector.

If otpomagnetic layer 2 is approximately as thick as or thinner than the wavelength of the scanning beam of light, some of the light will penetrate it. FIG. 2 illustrates how approximately 9% of the incident light will penetrate the areas of a layer having a thickness equal to $\lambda/2$ thick where there are no pits, whereas approximately 15% will be reflected. The rest is absorbed. Optomagnetic layer 2 is protected from damage with a transparent layer 10 with an index $n_1$ of refraction of 1.

Figure 3:
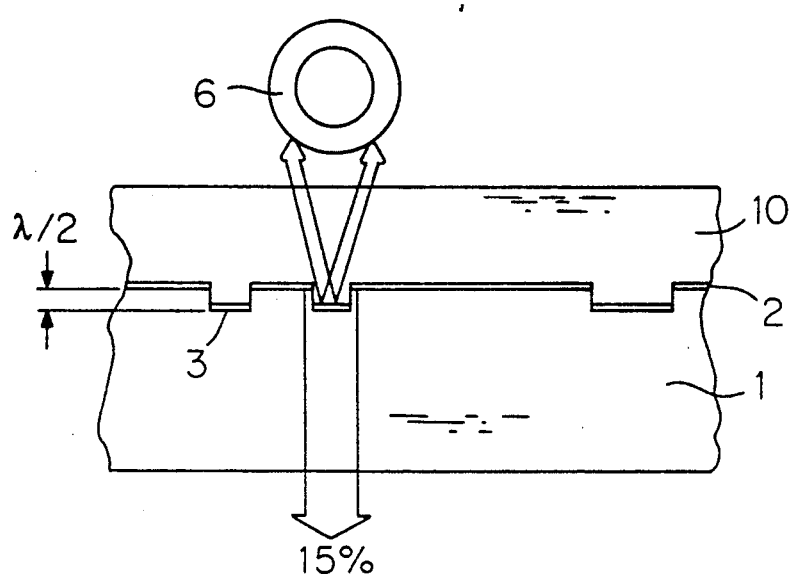
FIG. 3 illustrates the optical recording medium in conjunction with an annular photodetector.

FIG. 3 illustrates the distribution of the light at a pit 3 that is half as deep as the wavelength of the scanning beam of light. Again, 15% of the incident light is reflected. When the depth of the pit is equal to $\lambda/2$, however, diffraction patterns will occur behind the recorded medium because, due to a path distance difference equal to $\lambda/6$, the components of the light that shine through a depression will interfere with the components that shine through the thicker layer around the depression. The path difference is the difference in distances traveled by light reflected from a land and from a depression and traveling to a pick-up. There is a transparent layer 10 with an index $n_1$ of 1 to protect optomagnetic layer 2 from damage, such as scratches for example.

Since, with a pit depth of equal to $\lambda/2$, the path difference between the light reflected from a land and from a depression is $\lambda/2 + \lambda/2 = \lambda$, the light reflected at optomagnetic layer 2 and scanning the data stored in the magnetic domains of the recorded medium will not be contaminated by the pattern of pits. The pit depth can also be an odd multiple of $\lambda/2$ instead of $\lambda/2$. All that is essential is that the path difference be $\lambda$ or a whole multiple thereof.

Pits 3 can be detected in three different ways:

They can be detected by a photodetector 5 that is illustrated in FIG. 2 in the shape of a circle in that approximately 9% of the light will strike the photodetector in the absence of a pit and no light at all will ideally strike it in the presence of a pit because of the interference.

They can also be detected by a photodetector that is illustrated in FIG. 3 in the shape of a ring and can detect refraction maxima in the presence of a pit and accordingly read out the data stored therein. Ideally, no light will strike the annular photodetector in the absence of a pit.

Finally, it is also possible to combine both photodetectors, with circular photodetector 5 surrounded by annular photodetector 6. Photodetector 5 detects the unrefracted beams of light, and photodetector 6 detects the beams that are refracted to the first order. Since the signals from the two photodetectors always have different mathematical signs, the difference between the two signals represents the data represented by patterns of pits.

Figure 6:
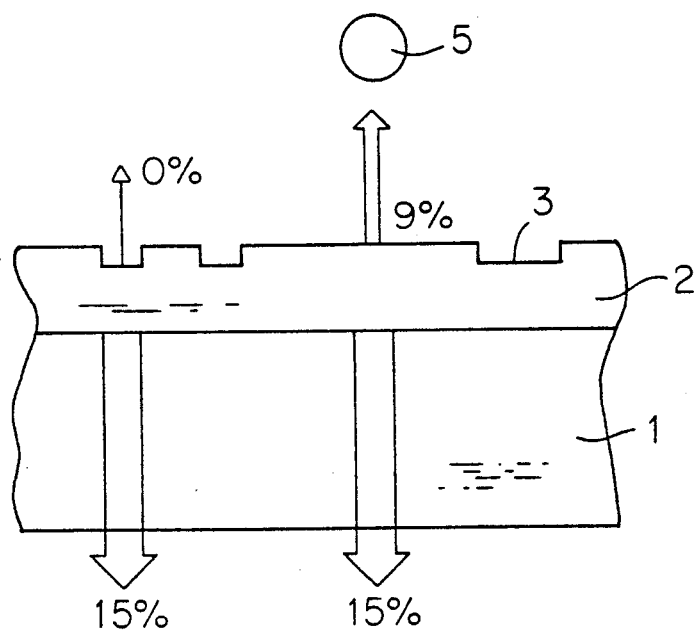
FIG. 6 illustrates still another embodiment of the optical recording medium.

In the embodiment illustrated in FIG. 6, transparent-substrate layer 1 is followed by optomagnetic layer 2, with the pits 3 in its outer surface. Optomagnetic layer 2, which has a thickness approximately equal to the dimension $\lambda$, reflects approximately 15% of the incident light. The reflected light represents the data stored in optomagnetic layer 2.

The pits can be detected as described with reference to the embodiment illustrated in FIG. 2.

Pits can be detected with a preferably circular photodetector because approximately 9% of the light will strike the photodetector in the absence of a pit, whereas ideally no light at all will strike the photodetector in the presence of a pit, because of the interference.

Finally, it is also possible to combine both photodetectors, with circular photodetector 5 surrounded by annular photodetector 6. Photodetector 5 detects the unrefracted beams of light and photodetector 6 detects the beams that are refracted to the first order. Since the signals from the two photodetectors always have different mathematical signs, the difference between the two signals represents the data stored by patterns of pits.

Figure 4:
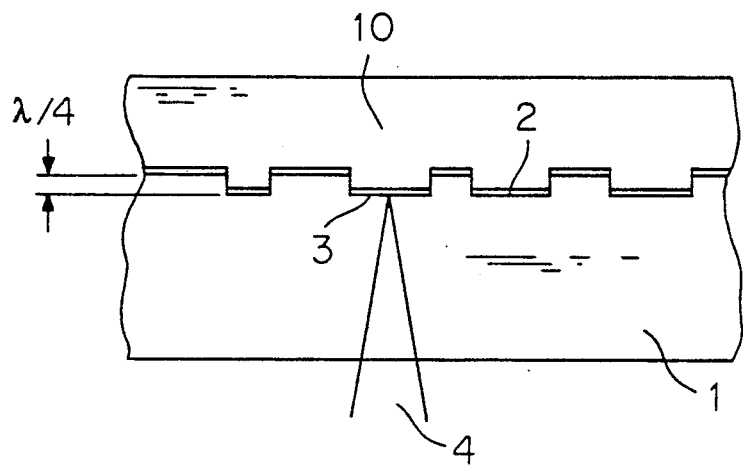
FIG. 4 illustrates another embodiment of the optical recording medium.

The pits in the embodiment illustrated in FIG. 4 have a depth equal to the dimension $\lambda/4$. The path difference is accordingly $\lambda/2$. The pits can also be any odd multiple of $\lambda/4$ deep. All that is essential is that the path difference between light reflected from a pit and the light reflected from a land in vicinity of the pit be $\lambda/2$ or $\lambda/2+n\lambda$, where n is a whole number.

In contrast to the optical recorded media illustrated in FIGS. 2 and 3, the reflected light represents the data stored by patterns of pits, whereas the penetrating light represents the magnetically stored data. It is not the Kerr effect, but the similar Faraday effect that is exploited to read the magnetically stored data.

Figure 5:
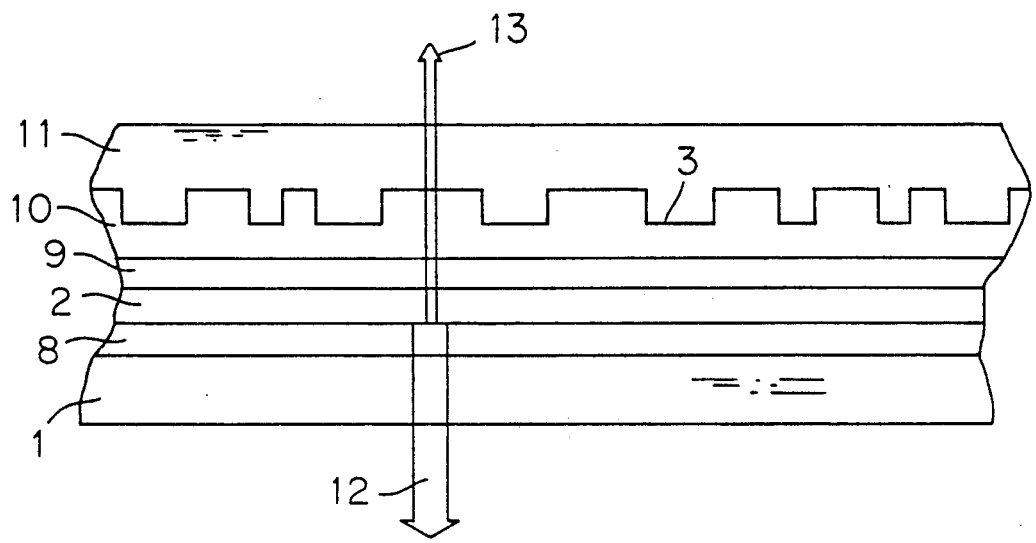
FIG. 5 illustrates a further embodiment of the optical recording medium.

The laminated structure of the optical recorded medium illustrated in FIG. 5 will now be described.

Transparent-substrate layer 1 is followed in sequence, by a first protective layer 8, an optomagnetic layer 2, a second protective layer 9, a first transparent layer 10 and a second transparent layer 11 with pits 3. The thickness of the various layers are, for simplicity's sake, not represented to scale.

Some 12 of the light 4 striking transparent-substrate layer 1 from below is reflected onto optomagnetic layer 2, and some 13 of the light travels through optomagnetic layer 2 and through the other layers 9, 10, and 11.

The light 12 reflected from optomagnetic layer 2 represents the data stored in that layer, whereas the light 13 that travels through the recorded medium represents the data stored in pits 3, if the pits are $\lambda/2$ or an odd multiple of $\lambda/2$ deep. If, on the other hand, the pits are $\lambda/4$ deep, the reflected light will represent the data stored by patterns of pits, and the penetrating light will represent the data stored by the optomagnetic layer. The index $n_2$ of refraction of transparent-substrate layer 1 and of second transparent layer 11 is 1.5 for example, whereas the index $n_1$ of refraction of first transparent layer 10, which can also, for example, be an empty space or air gap, is 1.

Figure 7:
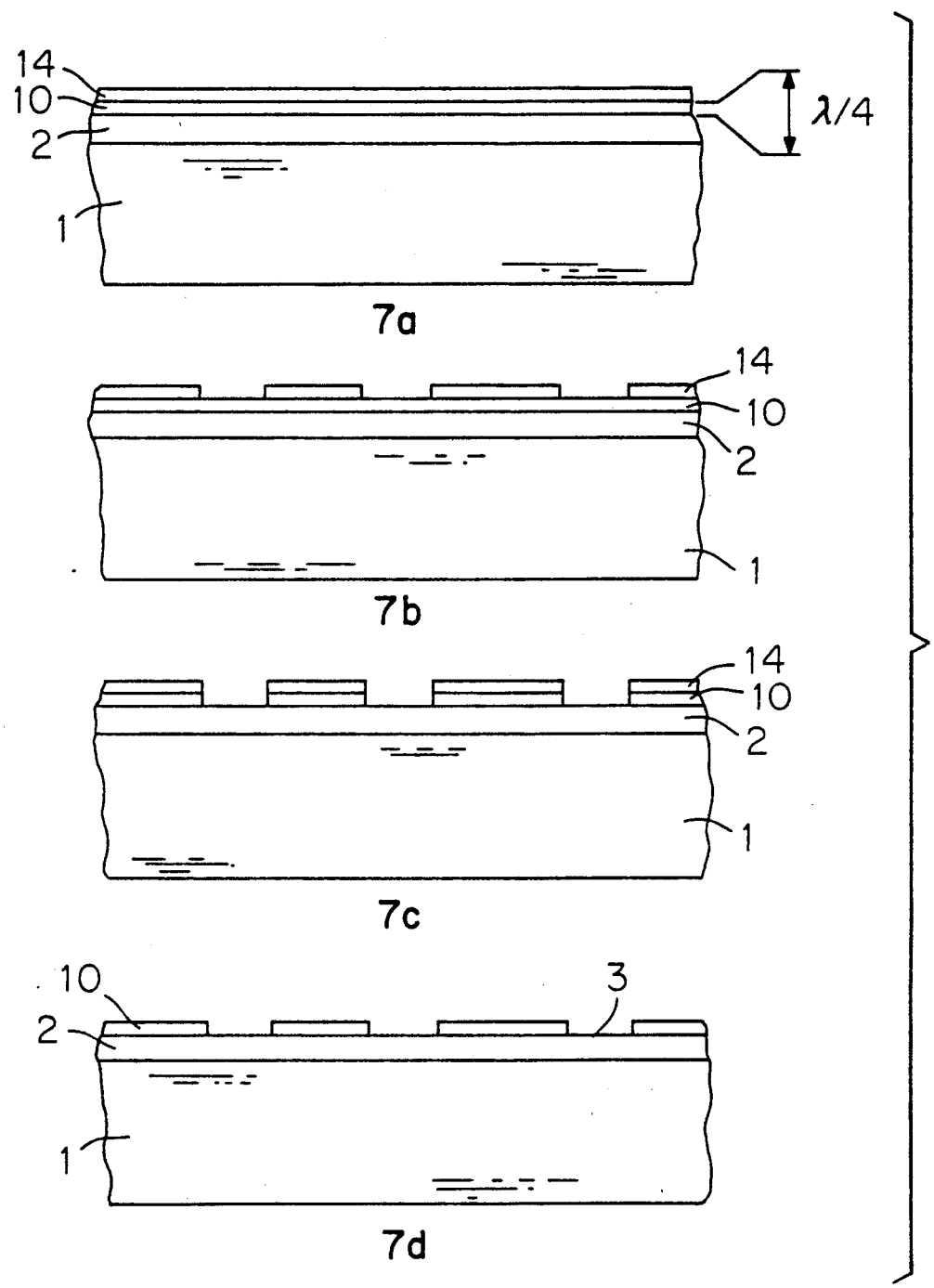
FIGS. 7(a-d) illustrate yet another embodiment of the optical recording medium.

FIG. 7d illustrates the laminated structure of the recorded medium.

A transparent-subsrrate layer 1 is followed by an optomagnetic layer 2, which, in turn, is followed by a transparent layer 10. The pits 3 in transparent layer 10 are $\lambda/4$ deep. Since optomagnetic layer 2 reflects approximately 15% of the light that strikes it and transmits approximately 9%, the pits can be detected as described with reference to FIGS. 2, 3, 4, and 6 from the penetrating light by either a circular or an annular photodetector or by a combination thereof. The magnetically stored data are represented by the reflected light.

This embodiment is especially easy to manufacture, as will be discussed now with reference to FIGS. 7a, 7b, 7c, and 7d.

The point of departure in the manufacturing process is a disc with a transparent-substrate layer 1 that is followed as will be evident from FIG. 7a by an optomagnetic layer 2. The latter is followed by a transparent layer 10 coated on photosensitive lacquer 14.

A pattern of pits is reproduced on photosensitive lacquer 14 by exposure. Once the lacquer has been developed, either the exposed or the unexposed areas of transparent layer 10 are washed out, leaving the layer uncovered at those points, as illustrated in FIG. 7b. The uncovered areas are then etched out of transparent layer 10, leaving only the exposed or unexposed photosensitive lacquer 14 on the disc along with transparent layer 10. FIG. 7c represents the process to this point.

The remaining photosensitive lacquer 14 is dissolved from transparent layer 10 in a final step, leaving only the elevations, called "land." In the vicinity of the pits, accordingly, optomagnetic layer 2 will be uncovered, as will be evident from FIG. 7d.

In relation to an embodiment of the invention, it is assumed that the data stored in the transparent layer are correlated with the data stored as the pattern of pits.

Thus, video signals can be recorded on a videodisc in accordance with the state of the art, and data that is correlated with the video signals stored as patterns of pits can be stored in the optomagnetic layer that in conjunction with the data stored as patterns of pits will result in a higher playback quality and in better picture and sound. One field can be stored as the pattern of pits and the other in the optomagnetic layer. A disc of this type can be played in either a conventional videodisc player or in equipment with high definition. The major advantage of a videodisc of this type is that it can be played in a conventional player and deliver ordinary quality. It can also be placed in a videodisc player that can utilize both signals—those that are stored as pits and those that are stored in the optomagnetic layer, to deliver a picture of high quality.

A substantial improvement in sound can also be attained in a compact disc when data that are correlated with the data stored as pits are recorded in the optomagnetic layer.

Another field of application is a videodisc with maps recorded on it, for example. Invariable features like mountains, contours, and bodies of water can be stored as pits, and variable data like detours and construction sites can be stored in the optomagnetic layer.

The optical recording medium in accordance with the present invention, however, is by no means restricted to the shape of a disc. It can also be in the form of a drum, for example. When in the form of a disc, it is especially convenient as a memory for computers, as a videodisc for videodisc players, and as a compact disc for compact-disc players.

An appropriate material for optomagnetic layer 2 is, for example, an alloy of iron, terbium, or gadolinium.

Since, as previously mentioned herein, the embodiment of the invention in the form of a disc represents a combination of a read-only compact disc and an optomagnetic disc that can be both read and written into, it combines the properties of both a ROM and a RAM and can accordingly be considered a ROM-RAM medium.

The data tracks with the pits and the magnetic tracks are superimposed in the disc, according to the present invention. The data tracks can be recorded on the disc in either concentric circles or in a spiral.

Figure 8:
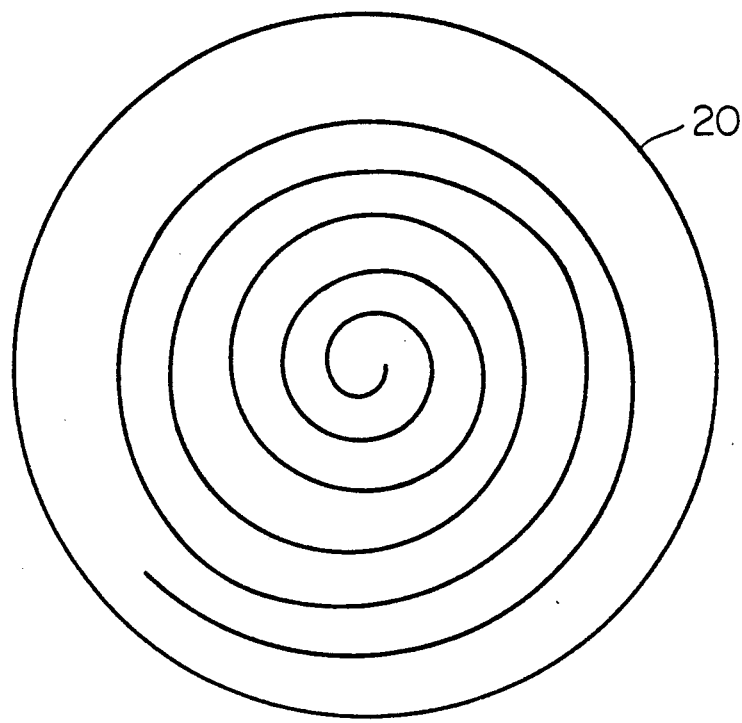
FIG. 8 is a schematic view of a disc with a spiral-shaped data track, according to the present invention.

FIG. 8 shows a disc 20 that has a spiral-shaped data track.

Figure 9:
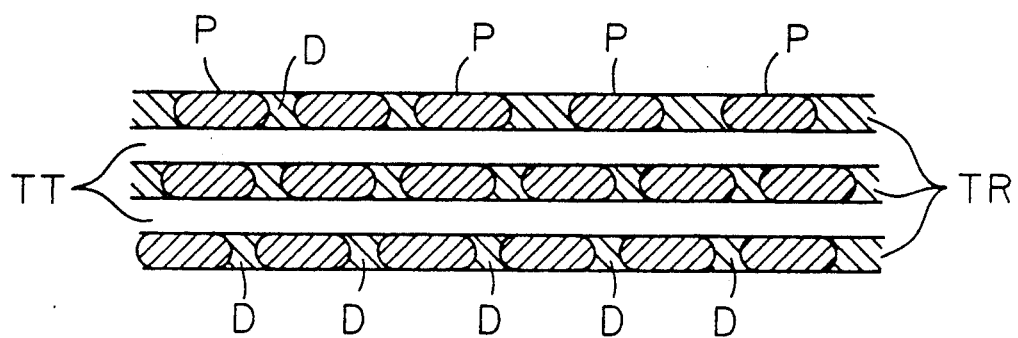
FIG. 9 is a schematic view of a disc with a plurality of adjacent data tracks.

FIG. 9 shows a plurality of adjacent data tracks TR tracking tracks TT. Each track with the pits P and the magnetic track with the different magnetic domains D lie superimposed on each other. The different cross-hatching illustrates the different magnetization of the magnetic domains.

We claim:

1. An optomagnetic recording medium comprising: a transparent substrate layer; a reflective optomagnetic layer on said transparent substrate layer; said reflective optomagnetic layer being recorded with magnetic data and pit data so that said recorded magnetic data and said recorded pit data are superimposed on each other in said optomagnetic layer and so that every spot and region on said recording medium stores both said magnetic and pit data and so that said recorded magnetic and pit data are arranged for being read out simultaneously by a single light beam and said recording medium being free of separate regions between the magnetic and pit data in a track direction.

2. An optomagnetic recording medium as defined in claim 1, wherein said pits have a depth less than a wavelength of said light beam.

3. An optomagnetic recording medium as defined in claim 2, wherein said pits have depressions with depths substantially 1/10 of a wavelength of said light beam.

4. An optomagnetic recording medium as defined in claim 1, wherein said pits have depressions with depths substantially half of a wavelength of said light beam.

5. An optomagnetic recording medium as defined in claim 1, wherein said pits have depressions with depths that are substantially an odd multiple of half a wavelength of said light beam.

6. An optomagnetic recording medium as defined in claim 1, wherein said pits have depressions with depths substantially $\frac{1}{4}$ of a wavelength of said light beam.

7. An optomagnetic recording medium as defined in claim 6, wherein said optomagnetic layer is penetrated by a part of said light beam and said optomagnetic layer reflects a part of said light beam carrying optomagnetically stored data.

8. An optomagnetic recording medium as defined in claim 1, wherein said pits have depressions with depths that are substantially an odd multiple of $\frac{1}{4}$ a wavelength of said light beam.

9. An optomagnetic recording medium as defined in claim 1, wherein said pits are located on a surface of said optomagnetic layer facing toward and contacting said substrate layer and said reflecting optomagnetic layer.

10. An optomagnetic recording medium as defined in claim 1, wherein data stored in said optomagnetic layer are correlated with data stored as said pits.

11. An optomagnetic recording medium as defined in claim 1, wherein said optomagnetic layer reflects a part of said light beam with optomagnetically stored data and said optomagnetic layer is penetrated by a part of said light beam carrying data stored as said pits.

12. An optomagnetic recording medium as defined in claim 1, wherein said optomagnetic layer reflects a part of said light beam with optomagnetically stored data and said optomagnetic layer is penetrated by a part of said light beam carrying data stored as said pits, said pits being located on a surface of said optomagnetic layer facing away from the substrate.

* * * * *